United States Patent
Katsumata et al.

(10) Patent No.: US 12,021,852 B2
(45) Date of Patent: Jun. 25, 2024

(54) METHODS OF GENERATING A KEY AND A COMMUNICATION METHOD

(71) Applicant: PQShield Ltd., Oxford (GB)

(72) Inventors: Shuichi Katsumata, Oxford (GB); Thomas Prest, Oxford (GB)

(73) Assignee: PQShield Ltd., Oxford (GB)

( * ) Notice: Subject to any disclaimer, the term of this patent is extended or adjusted under 35 U.S.C. 154(b) by 224 days.

(21) Appl. No.: 17/825,845

(22) Filed: May 26, 2022

(65) Prior Publication Data

US 2022/0294611 A1    Sep. 15, 2022

Related U.S. Application Data

(63) Continuation of application No. PCT/GB2020/053060, filed on Nov. 27, 2020.

(30) Foreign Application Priority Data

Nov. 27, 2019 (GB) ..................................... 1917300
Mar. 25, 2020 (GB) ..................................... 2004344

(51) Int. Cl.
- *H04L 29/06* (2006.01)
- *H04L 9/08* (2006.01)
- *H04L 9/14* (2006.01)
- *H04L 9/32* (2006.01)
- *H04L 9/40* (2022.01)

(52) U.S. Cl.
CPC .......... *H04L 63/061* (2013.01); *H04L 9/0825* (2013.01); *H04L 9/0838* (2013.01); *H04L 9/14* (2013.01); *H04L 9/3255* (2013.01)

(58) Field of Classification Search
CPC ...................................................... H04L 63/061
See application file for complete search history.

(56) References Cited

U.S. PATENT DOCUMENTS

| | | | |
|---|---|---|---|
| 4,200,770 A | | 4/1980 | Hellman et al. |
| 4,405,829 A | * | 9/1983 | Rivest ...................... H04L 9/302 380/255 |
| 8,341,401 B1 | * | 12/2012 | Kaufman .............. H04L 9/0844 726/19 |
| 2020/0007321 A1 | * | 1/2020 | Doliwa ..................... H04L 9/14 |
| 2020/0007327 A1 | * | 1/2020 | Garg ................... H04L 63/0428 |

OTHER PUBLICATIONS

Zheng et al: Big Data Analytics in the Social and Ubiquitous Context, 2018, "Two-Message Key Exchange with Strong from Ideal Lattices" Apr. 2018.

(Continued)

*Primary Examiner* — Bradley W Holder
(74) *Attorney, Agent, or Firm* — EIP US LLP

(57) ABSTRACT

A key generation method is provided. A first peer obtains an ephemeral key from a second peer via a server. The first peer uses the ephemeral key to compute a ciphertext that encrypts a first parameter. The first peer uses the first parameter to generate a session key. The ciphertext is sent to the server by the first peer to allow the second peer to generate the session key. The key may be subsequently used for communication, such as by using a key management algorithm such as Double Rachet.

8 Claims, 8 Drawing Sheets

(56) References Cited

OTHER PUBLICATIONS

Atsushi et al: Big Data Analytics in the Social and Ubiquitous Context,2012, "Strongly Secure Authenticated Key Exchange from Factoring Codes, and Lattices" Apr. 23, 2014; Designs, Codes and Cryptography 76, 469-504.
Bindel Nina et al: Adances in Databases and Information Systems, 2019, Bindel Nina et al., "Hybrid Key Encapsulation Mechanisms and Authenticated Key Exchange" Jul. 14, 2019.
Yoneyama, Kazuki: "Compact Authenticated Key Exchange from Bounded CCA-Secure KEM"; IEICE Transactions on Fundamentals of Electronics, Communications and Computer Sciences, Jan. 2015.
Peikert Chris et al: Noninteractive Zero Knowledge for NP from (Plain) Learning With Errors, Jun. 5, 2019.
Ward Beullens et al: Calamari and Falafl: Logarithmic (Linkable) Ring Signatures from Isogenies and Lattices, May 29, 2020.
Alwen Joel et al: The Double Ratchet: Security Notions, Proofs, and Modularization for the Signal Protocol, Feb. 21, 2020.
Hash Functions: https://csrc.nist.gov/projects/hash-functions, May 3, 2019.
Post-Quantum Cryptography—Round 2 submissions: https://csrc.nist.gov/projects/post-quantum-cryptography/round-2-submissions, Feb. 10, 2020.
Bonnetain et al: Submerging CSIDH; Oct. 7, 2018.
Castryck et al: CSIDH: An Efficient Post-Quantum Commutative Group Action; Oct. 26, 2018.
Brendel et al: Challenges in Proving Post-Quantum Key Exchanges Based on Key Encapsulation Mechanisms; Nov. 26, 2019.
Bonnetain et al: Quantum Security Analysis of CSIDH; Jun. 4, 2018.
Bader et al: Tightly-Secure Authenticated Key Exchange; Mar. 23, 2015.
Bellare, Mihir: "New Proofs for NMAC and HMAC: Security without Collision Resistance"; Journal of Cryptology (2015) 28:844-878, online publication Jun. 10, 2014.
Bellare, Mihir: Relations Among Notions of Security for Public-Key Encryption Schemes, May 28, 2006.
Bellare et al: Towards Plaintext-Aware Public-Key Encryption Without Random Oracles, Dec. 5, 2004.
Bellare et al: Entity Authentication and Key Distribution; Jul. 13, 2001.
Bellare et al: Optimal asymmetric encryption, May 23, 2006.
Bellare et al: Ratcheted Encryption and Key Exchange: The Security of Messaging. Aug. 2, 2017.
Bernstein, Daniel: Curve25519: New Diffie-Hellman Speed Records, Apr. 24, 2006.
Blake-Wilson et al: Key agreement protocols and their security analysis, Sep. 9, 1997.
Blake-Wilson et al: Unknown Key-Share Attacks on the Station-to-Station (STS) Protocol, Oct. 29, 1999.
Brendel et al: Towards postquantum security for signals x3dh handshake, Oct. 19, 2020.
Canetti et al: Analysis of Key-Exchange Protocols and Their Use for Building Secure Channels, Apr. 15, 2001.
Canetti et al: Security Analysis of IKE's Signature-Based Key-Exchange Protocol, Sep. 13, 2002.
Cash et al: The Twin Diffie-Hellman Problem and Applications; J. Cryptol. (2009) 22: 470-504.
Cohn-Gordon et al: A Formal Security Analysis of the Signal Messaging Protocol, Sep. 23, 2020.
Cohn-Gordon et al: Highly Efficient Key Exchange Protocols with Optimal Tightness, Oct. 12, 2019.
Cremers et al: Examining indistinguishability-based security models for key exchange protocols: the case of CK, CK-HMQV, and eCK, ETH zurich, Mar. 22, 2011.
Cremers et al: Session-state Reveal Is Stronger Than Ephemeral Key Reveal: Attacking the NAXOS Authenticated Key Exchange Protocol, Jun. 2, 2009.
Cremers et al: Beyond eCK: Perfect Forward Secrecy under Actor Compromise and Ephemeral-Key Reveal, Sep. 10, 2012.
Kock et al: Practical Isogeny-Based Key-Exchange with Optimal Tightness, Oct. 10, 2020.
Saint Guihem et al: Authentication in Key-Exchange: Definitions, Relations and Composition, Jun. 22, 2020.
Diraimondo et al: Deniable authentication and key exchange, Oct. 30, 2006.
Dodis et al: Composability and On-Line Deniability of Authentication, Mar. 15, 2009.
Durak et al: Bidirectional asynchronous ratcheted key agreement with linear complexity. Jul. 24, 2019.
Fisclin Marc: Communication-efficient non-interactive proofs of knowledge with online extractors, Aug. 14, 2005.
Fouque et al: HMAC is a randomness extractor and applications to TLS; Proceedings of the 2008 ACM Symposium on Information, computer and communications security (AsiaCCS '08) (Mar. 18-20, 2008, Tokyo, Japan), pp. 21-32.
Freire et al: Non-Interactive Key Exchange, Feb. 26, 2013.
Fujioka et al: Strongly secure authenticated key exchange from factoring, codes, and lattices, ResearchGate, May 21, 2012.
Gjosteen et al: Practical and Tightly-Secure Digital Signatures and Authenticated Key Exchange, Jul. 24, 2018.
Guo et al: Limits on the efficiency of (ring) LWE based non-interactive key exchange, Dec. 12, 2020.
Hovelmanns et al: Generic Authenticated Key Exchange in the Quantum Random Oracle Model, Jan. 29, 2020.
Jager et al: Tightly-Secure Authenticated Key Exchange, Revisited, Oct. 14, 2020.
Jost et al: Efficient Ratcheting: Almost-Optimal Guarantees for Secure Messaging, Apr. 18, 2019.
Jost et al: A unified and composable take on ratcheting, Nov. 22, 2019.
Kawashima et al: An Efficient Authenticated Key Exchange from Random Self-reducibility on CSIDH, Dec. 2, 2020.
Krawczyk et al: HMQV: A high-performance secure Diffie-Hellman protocol, Jul. 5, 2005.
Amacchia et al: Stronger Security of Authenticated Key Exchange, Nov. 1, 2007.
LaMacchia et al: Stronger Security of Authenticated Key Exchange, Nov. 1, 2007.
Li et al., "No Match Attacks and Robust Partnering Definitions—Defining Trivial Attacks for Security Protocols is Not Trivial" Oct. 30, 2017.
Myers et al., "Blackbox Construction of a More Than Non-Malleable CCA1 Encryption Scheme from Plaintext Awareness", Sep. 5, 2012.
Paquin et al., "Benchmarking Post-Quantum Cryptography in TLS", Feb. 6, 2020.
Peikert, Chris, "He Gives C-Sieves on the CSIDH", Feb. 23, 2020.
Poettering et al., "Towards bidirectional ratcheted key exchange", Jul. 25, 2018.
Pointcheval et al., "Forward Secure Non-Interactive Key Exchange" Sep. 3, 2014.
Unger et al., "Deniable key exchanges for secure messaging", Oct. 12, 2015.
Unger et al., "Improved strongly deniable authenticated key exchanges for secure messaging", Jan. 11, 2018.
Vatandas et al., "On the Cryptographic Deniability of the Signal Protocol", Aug. 29, 2020.
Xue et al., "Compact authenticated key exchange in the quantum random oracle model", Oct. 14, 2020.
Xue et al., "Understanding and Constructing AKE via Double-Key Key Encapsulation Mechanism", Oct. 27, 2018.
Yang, Zheng, "Modelling simultaneous mutual authentication for authenticated key exchange", Mar. 21, 2014.
Yao et al., "Deniable Internet Key Exchange", Jun. 22, 2010.
Alwen et al., "Security analysis and improvements for the IETF MLS standard for group messaging", Oct. 15, 2019 al.
Boyd et al., "Efficient one-round key exchange in the standard model", May 7, 2008.

(56) References Cited

OTHER PUBLICATIONS

Brakerski et al., "A framework for efficient signatures, ring signatures and identity based encryption in the standard model", Sep. 7, 2010.
Bernstein et al. "Quantum circuits for the CSIDH: Optimizing quantum evaluation of isogenies", Apr. 24, 2019.
Cohn-Gordon et al., "Post-compromise security", Oct. 14, 2019.
Cohn-Gordon et al., "On ends-to-ends encryption: Asynchronous group messaging with strong security guarantees", Oct. 15, 2018.
Cremers et al., "Efficient Post-Compromise Security Beyond One Group", Dec. 1, 2019.
Ding et al., "Complete attack on RLWE key exchange with reused keys, without signal leakage", Dec. 12, 2017.
Durak et al., "Generic Round-Function-Recovery Attacks for Feistel Networks over Small Domains", Jan. 30, 2018.
Ding et al., "A simple provably secure key exchange scheme based on the learning with errors problem", Dec. 10, 2012.
Fluhrer, Scott, "Cryptanalysis of ring-LWE based key exchange with key share reuse", Jan. 30, 2016.
Fujisaki et al., "Secure Integration of Asymmetric and Symmetric Encryption Schemes" Dec. 16, 1999.
Gunther et al., "0-RTT key exchange with full forward secrecy", Apr. 1, 2017.
Jeong et al., One-Round Protocols for Two-Party Authenticated Key Exchange Jun. 8, 2004.
Krawczyk, Hugo, "SIGMA: The 'SIGn-and-MAc' Approach to Authenticated Diffie-Hellman and Its Use in the IKE Protocols", Aug. 17, 2003.
Peikert, Chris, "Lattice cryptography for the internet", Jul. 16, 2014.
Rosler et al., More is less: on the end-to-end security of group chats in Signal, Whatsapp, and Threema, Jan. 15, 2018.
Rivest et al., "How to leak a secret" Nov. 20, 2001.
Menezes A: Some new key agreement protocols providing implicit authentication Apr. 24, 1995.
Fujioka et al: Practical and post-quantum authenticated key exchange from one-way secure key encapsulation mechanism May 8, 2013.

\* cited by examiner

METHODS OF GENERATING A KEY AND A COMMUNICATION METHOD

CROSS-REFERENCE TO RELATED APPLICATIONS

This application is a continuation of International Application No. PCT/GB2020/053060, filed Nov. 27, 2020, which claims the benefit under 35 U.S.C. § 119(a) and 37 CFR § 1.55 to GB patent application no. 2004344.4, filed on Mar. 25, 2020, and to GB patent application no. 1917300.4, filed on Nov. 27, 2019. Each of the above-referenced patent applications is incorporated by reference in its entirety.

BACKGROUND

Technical Field

The present invention relates to methods of generating a key. Some embodiments provide methods of generating a key suitable for use as a session key for communication between peers.

Background of the Invention

Signal (RTM) is a cryptographic protocol that can be used for end-to-end encryption of instant messaging conversations, voice calls, video calls etc. The Signal (RTM) protocol is built upon several other protocols including X3DH which is a key agreement protocol and Double Ratchet which is a key management algorithm. Double Ratchet is a key management algorithm that derives new keys for messages so that earlier keys cannot be calculated from later ones and later keys cannot be computed from earlier keys alone. These properties are referred to as forward secrecy and post-compromise security respectively.

X3DH key agreement is a key agreement protocol for establishing a shared secret key (session key) between two parties. X3DH is built upon the Diffie-Hellman key exchange that is described in U.S. Pat. No. 4,200,770.

FIG. 1 is a figure that informally illustrates the X3DH protocol. Alice and Bob are peers that wish to communicate securely with each other. Alice has a public key ($pk_A = g^a$) and a secret key ($sk_A = a$) and Bob has a public key ($pk_B = g^b$) and a secret key ($sk_B = b$). A public base number, g, is also known to both Bob and Alice. In order to generate a session key K, Alice generates a random number x and transmits $g^x$ to Bob. Bob generates a random number y and transmits $g^y$ to Alice. The numbers x and y are not easily derivable from $g^x$ and $g^y$ because of the difficulty of the discrete logarithm problem. The session key, K, is generated as $K := H(g^{ay}, g^{bx}, g^{xy})$ where H is a hash function. Alice can derive the session key because she has the secret random number, x, and her secret key, a, which allows her to calculate all the parameters $g^{ay}$, $g^{bx}$, and $g^{xy}$ with the use of Bob's public key, $g^b$. Similarly, Bob has the secret random number, y, and his secret key, b, which allows him to calculate all the parameters with use of Alice's public key, $g^a$. However, a third party having only the two public keys ($g^a$, $g^b$) and the two exchanged parameters ($g^x$, $g^y$) cannot easily derive the session key K.

The X3DH protocol works well under traditional paradigms. Unfortunately, the advent of quantum computers threatens to break this and other key exchange mechanisms. The reason for this is that the mathematical problems, such as the discrete logarithm problem, on which this protocol are based are likely to become soluble with sufficiently powerful quantum computers. Accordingly, there is a need to find post-quantum alternatives.

A project by NIST (National Institute of Standards and Technology) has attempted to settle post-quantum cryptography standards. In particular, the project has mainly focussed on key encapsulation mechanisms and digital signatures. Key encapsulation mechanisms are for securely communicating a symmetric key using an asymmetric algorithm. Digital signature schemes are mathematical schemes for verifying with high probability the identity of a party that sent a document or message.

A key encapsulation mechanism is formed of three components: a key generation function, an encapsulation function and a decapsulation function. The key generation function for a given a security parameter generates an encapsulation key and a decapsulation key. The encapsulation function, given the encapsulation key, generates a symmetric key and an encapsulation of the symmetric key under the encapsulation key. The decapsulation function, given the decapsulation key, outputs the symmetric key or an error symbol. Post-quantum key encapsulation mechanisms have been researched and several viable options exist, such as SABER, Round5, and CRYSTALS-KYBER.

It might be thought that replacing the Diffie-Hellman mechanism within protocols such as X3DH with a post-quantum key encapsulation mechanism would be straight-forward. However, this has not proved to be the case. The paper, "Challenges in proving post-quantum key exchanges based on key encapsulation mechanisms", by Jacqueline Brendel et al, 26 Nov. 2019 published in the IACR Cryptology ePrint archive, explain the difficulties in replacing the Diffie-Hellman protocol. The paper proposes a formalism called split-key encapsulation mechanism (or split-KEM) but ends by acknowledging that challenges remain in developing post-quantum constructions that support static-static key exchanges and, in particular, the authors did not manage to instantiate their split-KEM notion from post-quantum assumptions.

At least two problems arise when trying to find a post-quantum replacement for X3DH: the lack of secure static-static (or static-ephemeral) Diffie-Hellman-like key exchanges and the need for the initial key exchange to be receiver-oblivious. In connection with the first issue, lattice-based key exchanges that can provide something analogous to a Diffie-Hellman key exchange do exist, such as Ding's key exchange and Peikert key exchange. However, both schemes are known to be insecure if they re-use the same key. That is to say that the key exchange is only secure if Alice and Bob only use their key once. Accordingly, with lattice-based Diffie-Hellman-like key exchange mechanisms, it is only possible to have secure ephemeral-ephemeral key exchanges as the keys need to keep changing. In order to make an analogue of X3DH, we need a static-ephemeral key exchange. The second difficulty arises from the asynchronous nature of messaging. A user of a messaging service wants to be able to send a message regardless of whether the recipient is online. Accordingly, an ephemeral key posted by Alice to allow Bob to send a message ($g^x$ in the example above) needs to be receiver-oblivious and not dependent upon details of the peer sending the message. Unfortunately, many Key Encapsulation Mechanisms, including Ding's key exchange and Peikert key exchange, require the identity of the peer when creating the initial key package making them unsuitable for replacing the X3DH scheme.

The terms 'peer' and 'party' are used interchangeably throughout this specification and both terms refer to an entity that performs steps to generate a session key.

The present invention provides a key agreement method that was created in view of the aforementioned problems.

BRIEF SUMMARY

According to a first aspect there is provided a method of generating a session key for exchange of data between a first peer and a second peer, the method comprising the second peer: obtaining an ephemeral key from the first peer; using the ephemeral key to compute a ciphertext, such that the ciphertext encrypts a first parameter; computing a second ciphertext, such that the second ciphertext encrypts a second parameter; generating a pair of intermediate keys from the first parameter and the second parameter; encrypting a session identifier using two intermediate keys to generate the session key, wherein the two intermediate keys are the pair of intermediate keys; and sending the ciphertext and second ciphertext to allow the first peer to generate the session key based on the ciphertext and second ciphertext, wherein the session identifier is generated based on one or more of: an identifier of the first peer, an identifier of the second peer, a public key of the first peer, a public key of the second peer, the ephemeral key received from the first peer, the cipher text computed from the received ephemeral key, and the second ciphertext.

According to a second aspect there is provided a method of generating a session key for exchange of data between a first peer and a second peer, the method comprising the first peer: obtaining a ciphertext that encrypts a first parameter; receiving a second ciphertext that encrypts a second parameter from the second peer; decrypting the ciphertext to obtain the first parameter; decrypting the second ciphertext to generate a second parameter; generating a pair of intermediate keys from the first parameter and the second parameter; and encrypting a session identifier using two intermediate keys to generate the session key, wherein the two intermediate keys are the pair of intermediate keys, wherein the session identifier is generated based on one or more of: an identifier of the first peer, an identifier of the second peer, a public key of the first peer, a public key of the second peer, an ephemeral key, the cipher text, and the second ciphertext.

According to a third aspect there is provided a non-transitory computer-readable storage medium storing a program that, when executed on an information processing apparatus, causes the information processing apparatus to perform a method of generating a session key for exchange of data between a first peer and a second peer, the method comprising the second peer: obtaining an ephemeral key from the first peer; using the ephemeral key to compute a ciphertext, such that the ciphertext encrypts a first parameter; computing a second ciphertext, such that the second ciphertext encrypts a second parameter; generating a pair of intermediate keys from the first parameter and the second parameter; encrypting a session identifier using two intermediate keys to generate the session key, wherein the two intermediate keys are the pair of intermediate keys; and sending the ciphertext and second ciphertext to allow the first peer to generate the session key based on the ciphertext and second ciphertext, wherein the session identifier is generated based on one or more of: an identifier of the first peer, an identifier of the second peer, a public key of the first peer, a public key of the second peer, the ephemeral key received from the first peer, the cipher text computed from the received ephemeral key, and the second ciphertext.

Further features and advantages of the invention will become apparent from the following description of preferred embodiments of the invention, given by way of example only, which is made with reference to the accompanying drawings.

DETAILED DESCRIPTION

Figure 1:
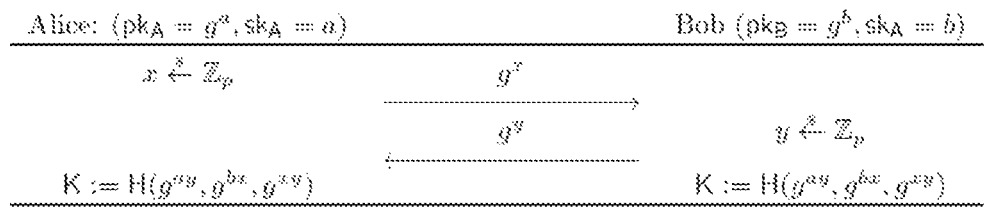
FIG. 1 is a message flow diagram that shows the X3DH key exchange protocol.

According to a first exemplary embodiment, there is provided a method of generating a session key for exchange of data between a first peer and a second peer, the method comprising the second peer: obtaining an ephemeral key from the first peer; using the ephemeral key to compute a ciphertext, such that the ciphertext encrypts a first parameter; generating a session key using the first parameter; and sending the ciphertext to allow the second peer to generate the session key.

The step of generating the session key may comprise signing the ciphertext to generate a ciphertext signature; and generating the session key by combining the first parameter and the ciphertext signature.

The step of generating a key may comprise hashing the first parameter and the ciphertext signature. The hashing algorithm may be SHA-2, SHA-3 or a function derived from SHA-2 or SHA-3 such as SHAKE128 or SHAKE256. However, any other form of combination of the first parameter and the ciphertext signature may be acceptable. The key may be a session key for peer-to-peer communication.

The step of using the ephemeral key to compute ciphertext that encrypts the first parameter may comprise applying a key encapsulation mechanism using the ephemeral key to generate a ciphertext that encrypts a first parameter. The first parameter may be generated by the key encapsulation mechanism or may be generated separately from the key encapsulation mechanism. In cases where the first parameter is generated separately from the key encapsulation mechanism, the first parameter may be randomly generated. The key encapsulation mechanism may be a post-quantum key encapsulation mechanism. In particular, the key encapsulation mechanism may be a key encapsulation mechanism based on one of a lattice-based key encapsulation mechanism, a code-based key encapsulation mechanism, a multivariate-based key encapsulation mechanism, and an isogeny-based key encapsulation mechanism.

The step of signing the ciphertext may comprise signing the ciphertext using a signature scheme. The signature scheme may be a post-quantum signature scheme. The signature scheme may be one of a lattice-based signature scheme, a code-based signature scheme, a hash-based signature scheme, an isogeny-based signature scheme, and a multivariate-based signature scheme.

The method may include sending the ciphertext signature or uploading the ciphertext signature to a server. The method may include a step of using a public key encryption scheme to encrypt the ciphertext signature to generate an encrypted ciphertext signature. In this case the method may include sending the encrypted ciphertext signature or uploading the encrypted ciphertext signature to a server. The public key encryption scheme may be a post-quantum public key encryption scheme. In particular, the public key encryption scheme may be one of a lattice-based key encryption scheme, a code-based key encryption scheme, a multivariate-based key encryption scheme, and an isogeny-based key encryption scheme. The encryption of the ciphertext signature may act to preserve the anonymity of the peer sending or uploading the ciphertext signature to the server.

The method may be for generating a session key for communication between a first peer and a second peer, wherein the step of generating a key may comprise combining the first parameter, the ciphertext signature, and a transcript of communication between the first peer and the second peer. The inclusion of the transcript may serve to prevent unknown key share attacks.

The method may be a method for generating a session key for communication between a first peer and a second peer and the ephemeral key may be a receiver-oblivious ephemeral key. A receiver-oblivious key is a key that is generated without any information that identifies the peer that the key is to be used by.

The step of obtaining an ephemeral key may comprise retrieving the ephemeral key from a server.

The method may include, following generation of the key, using a key management algorithm to generate a communication key for use in communication between peers. The method may comprise communicating with a peer using one of the key or the communication key. The key management algorithm may be the Double Ratchet algorithm or a post-quantum key management algorithm.

The method may be performed by a key generation apparatus having a processing element and a storage, in which the storage stores code portions configured to cause the processing element to carry out the steps of the method.

A method according to the first exemplary embodiment may further comprise computing a second ciphertext, such that the second cipher text encrypts a second parameter, wherein the second ciphertext is sent to allow the first peer to generate the session key based on the ciphertext and the second ciphertext. The second ciphertext may be generated using a public key associated with the first peer.

Generating the session key may comprise: generating a pair of intermediate keys from the first parameter and the second parameter; and encrypting a session identifier using the pair of intermediate keys to generate the session key. The pair of intermediate keys may be generated from the first parameter and the second parameter using one or more pseudo-random function.

The session identifier may be generated based on one or more of: an identifier of the first peer, an identifier of the second peer, a public key of the first peer, a public key of the second peer, the ephemeral key received from the first peer, the cipher text computed from the received ephemeral key, and the second ciphertext.

The method may comprise signing a session identifier using a signing function of a signature scheme to generate a signature. In some implementations, the signing function uses a private signature key of the second peer to generate the signature.

The method may further comprise: generating a second key and encrypting the signature with the second key. The second key may be generated using the pair of intermediate keys.

The signature scheme may be a ring signature scheme. The first party may receive an exchange key from the first peer. Generating the signature may be performed using a signature function, the exchange key and a verification key of the second peer. In some such embodiments, the method may further comprise: receiving a proof from the first peer that the first peer is in possession of a private signature key corresponding to the received exchange key; and verifying the received proof using the exchange key.

According to a second exemplary embodiment there is provided a method of generating a session key for exchange of data between a first peer and a second peer, the method comprising the first peer: obtaining a ciphertext that encrypts a first parameter; decrypting the ciphertext to obtain the first parameter; and generating the session key using the first parameter.

The method may comprise receiving an encrypted ciphertext signature; and decrypting the encrypted ciphertext signature to obtain a ciphertext signature, wherein generating the session key comprises combining the first parameter and the ciphertext signature.

The step of generating a key may comprise hashing the first parameter and the ciphertext signature. The hashing algorithm may be SHA-2, SHA-3 or a function derived from SHA-2 or SHA-3 such as SHAKE128 or SHAKE256. However, any other form of combination of the first parameter and the ciphertext signature may be acceptable.

The step of decrypting the ciphertext to obtain the first parameter may comprise a step of using a key decapsulation function of a key encapsulation mechanism to decapsulate the ciphertext. The key encapsulation mechanism may be a post-quantum key encapsulation mechanism. In particular, the key encapsulation mechanism may be a key encapsulation mechanism based on one of a lattice-based key encapsulation mechanism, a code-based key encapsulation mechanism, a multivariate-based key encapsulation mechanism, and an isogeny-based key encapsulation mechanism.

The step of decrypting the encrypted ciphertext signature may comprise using a decryption function of a public key encryption scheme. The public key encryption scheme may be a post-quantum public key encryption scheme. The public key encryption scheme may be one of a lattice-based key encryption scheme, a code-based key encryption scheme, a multivariate-based key encryption scheme, and an isogeny-based key encryption scheme.

The method may comprise a step of verifying the ciphertext signature against the ciphertext in order to verify an identity of a peer that signed the ciphertext. The step of verifying the ciphertext signature against the ciphertext may comprise using a verification function of a signature scheme to obtain the ciphertext and comparing the ciphertext with the ciphertext that was obtained. The signature scheme may be a post-quantum signature scheme. The signature scheme may be one of a lattice-based signature scheme, a code-based signature scheme, a hash-based signature scheme, and a multivariate-based signature scheme. In this way, it may be possible to verify the identity of the peer being communicated with.

The method may comprise the step of generating a pair of ephemeral keys, uploading a first of the ephemeral keys to a server, and storing a second of the ephemeral keys. The step of generating a pair of ephemeral keys may comprise using a key generation function of a key encapsulation scheme in order to generate a pair of ephemeral keys.

The step of decrypting the ciphertext may include decrypting the ciphertext using the second of the ephemeral keys.

The method may include, following generation of the key, using a key management algorithm to generate a communication key for use in communication. The method may comprise communicating with a peer using one of the key or the communication key. The key management algorithm may be the Double Ratchet algorithm or a post-quantum key management algorithm.

The method may be performed by a key generation apparatus having a processing element and a storage, in which the storage stores code portions configured to cause the processing element to carry out the steps of the method.

A method according to the second aspect may comprise: receiving a second ciphertext from the second peer; and decrypting the second ciphertext to generate a second parameter.

Generating the session key may comprise: generating a pair of intermediate keys from the first parameter and the second parameter; and encrypting a session identifier using the pair of intermediate to generate the session key. The intermediate keys may be generated from the first parameter and second parameter using one or more pseudo-random function.

The session identifier may be generated based on one or more of: an identifier of the first peer, an identifier of the second peer, a public key of the first peer, a public key of the second peer, the ephemeral key received from the first peer, the cipher text computed from the received ephemeral key, and the second ciphertext.

The method may further comprise: receiving an encrypted signature from the second peer; generating a second key; and decrypting the received signature using the second key to produce a signature. The second key may be generated using the pair of intermediate keys.

The method may comprise verifying the signature using a verification function of a signature scheme. The verification function may use a session identifier and a public verification key of the second peer to verify the signature.

In some embodiments, the signature scheme is a ring signature scheme. Such embodiments may further comprise: generating a ring signature scheme key pair including an exchange key and a private key; generating a proof that the first peer possesses the generated private key; and sending the exchange key and the proof to the second peer.

According to a third exemplary embodiment there is provided a key-exchange method for creating a common key between a first peer and a second peer, the method comprising: the first peer obtaining an ephemeral key from the second peer; the first peer using the ephemeral key to compute a ciphertext, such that the ciphertext encrypts a first parameter; the first peer signing the ciphertext to generate a ciphertext signature; the first peer generating a common key by combining the first parameter and the ciphertext signature; the second peer generating the common key.

The method may comprise the first peer using a public key encryption scheme to encrypt the ciphertext signature to generate an encrypted ciphertext signature. The first peer may make the encrypted ciphertext signature and the ciphertext available to the second peer. The first peer may upload the encrypted ciphertext signature and the ciphertext to a server.

The step of the second peer generating the key may comprise the second peer: receiving the ciphertext and the encrypted ciphertext signature from the first peer; decrypting the ciphertext to obtain the first parameter; decrypting the encrypted ciphertext signature to obtain the ciphertext signature; and generating the common key by combining the first parameter and the ciphertext signature.

The method may comprise the second peer generating a pair of ephemeral keys, uploading a first of the ephemeral keys to a server, and storing a second of the ephemeral keys, wherein the step of the first peer obtaining an ephemeral key comprises the first peer retrieving the first of the ephemeral keys from the server.

The method may further comprise the step of the first and second peers communicating with each other using a key management algorithm based on the common key.

According to a fourth exemplary embodiment there is provided a program that, when executed on an information processing apparatus, causes the information processing apparatus to perform a method as described in connection with a previous exemplary embodiment.

According to a fifth exemplary embodiment there is provided a key generation apparatus configured to perform a method as described in connection with a previous exemplary embodiment.

According to a sixth exemplary embodiment there is provided a key generation apparatus comprising: communication means configured to obtain an ephemeral key; and processing means configured to use the ephemeral key to compute a ciphertext, such that the ciphertext encrypts a first parameter, sign the ciphertext to generate a ciphertext signature, and generate a key by combining the first parameter and the ciphertext signature.

According to a seventh exemplary embodiment there is provided a key generation apparatus comprising: communication means configured to obtain a ciphertext that encrypts a first parameter, and an encrypted ciphertext signature; and a processing means configured to decrypt the ciphertext to obtain the first parameter, decrypt the encrypted ciphertext signature to obtain the ciphertext signature, and generate a key by combining the first parameter and the ciphertext signature.

According to an eighth exemplary embodiment there is provided a key-exchange system for creating a common key, the communication system comprising a first peer and a second peer, the first peer comprising: communication means configured to obtain an ephemeral key associated with the second peer; and processing means configured to use the ephemeral key to compute a ciphertext, such that the ciphertext encrypts a first parameter, sign the ciphertext to generate a ciphertext signature, and generate a common key by combining the first parameter and the ciphertext signature; and the second peer comprising processing means configured to generate the common key.

According to a ninth exemplary embodiment there is provided a method of selecting a key exchange process for use between a first peer and a second peer, the method comprising: the first peer uploading to a server a plurality of ephemeral keys and respective identifiers, each ephemeral key having been generated by a different key exchange process and the respective identifier identifying the key exchange process used to generate the ephemeral key.

The method may comprise the second peer selecting an ephemeral key from the plurality of ephemeral keys uploaded by the first peer and returning to the first peer one or more key exchange parameters in accordance with the key exchange process identified by the identifier associated with selected ephemeral key. The second peer may additionally return the identifier associated with the selected ephemeral key along with the one or more key exchange parameters. The first peer may then identify the key exchange process used by the second peer using the identifier and derive a common key using the identified key exchange process and the received one or more key exchange parameters.

Figure 2:
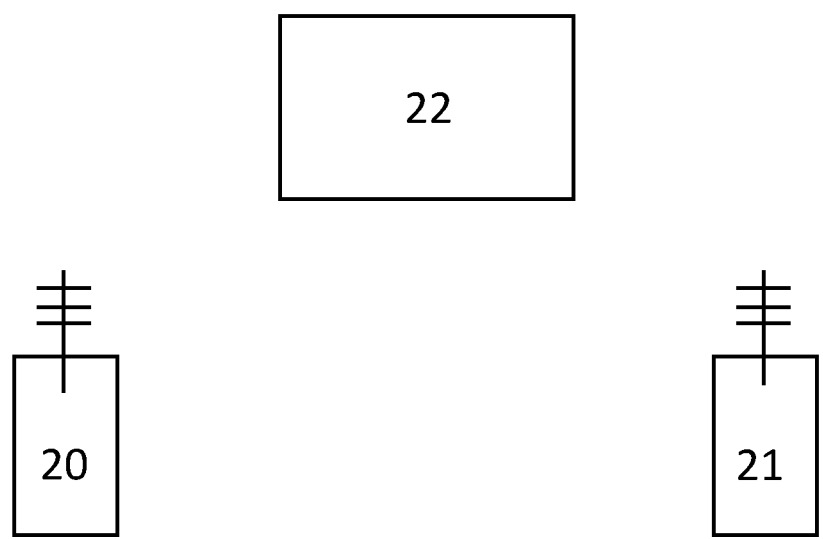
FIG. 2 is a block diagram that shows a communication system that can utilise examples herein.

FIG. 2 shows a communication system including two peers in the form of peer-to-peer messaging applications installed on mobile phones 20 and 21. A server 22 is provided in network communication with each of the mobile phones. The mobile phones may communicate with the server using telecommunications network infrastructure or by using local wireless networks, such as Wi-Fi etc. For simplicity of explanation, in the first embodiment, mobile phone 20 belongs to Alice and mobile phone 21 belongs to Bob. Accordingly, the peers and peer-to-peer messaging applications will be referred to as 'Alice' and 'Bob' in the remainder of the description of this embodiment. The mobile phones of course each have processors and respective data storage for storing and executing application programme code and for storing cryptographic keys and the like.

Figure 3:
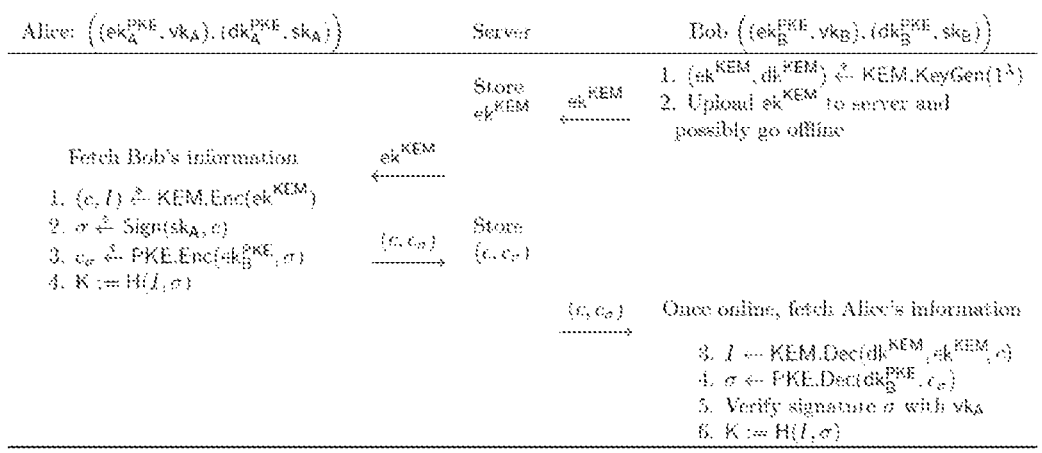
FIG. 3 is a message flow diagram that shows a key exchange process according to an example.

FIG. 3 shows a key exchange between Alice and Bob in which Alice and Bob use a key encapsulation mechanism to generate a common key K. Alice and Bob use the same key encapsulation mechanism. The key encapsulation mechanism is a post-quantum secure key encapsulation mechanism, and in the example is the SABER key encapsulation mechanism, although other key encapsulation mechanisms such as Round5 and CRYSTALS-KYBER could be used.

The SABER key encapsulation mechanism includes a key generator, KEM.KeyGen, an encapsulation function KEM.Enc, and a decapsulation function, KEM.Dec.

Alice and Bob also have an agreed signature scheme. The signature scheme is also post-quantum secure, and in the example is Falcon. Another signature scheme that could be used is CRYSTALS-DILITHIUM, but many other signature schemes are available. The signature scheme has a signing function, Sign, and a verification function, Verify. Alice has a verification-signing key pair associated with the signature scheme (vk$_A$, sk$_A$) and Bob has a verification-signing key pair (vk$_B$, sk$_B$) associated with the signature scheme.

Alice and Bob are also configured to use the same public key encryption scheme. In the embodiment, the public key encryption scheme is SABER public key encryption scheme. Again, other public key encryption schemes such as Kyber could be used. The public key encryption scheme has an encryption function, PKE.Enc, and a decryption function, PKE.Dec. Alice has a public key, ek$_A^{PKE}$, and a secret key, dk$_A^{PKE}$, and Bob has a public key, ek$_B^{PKE}$, and a secret key, dk$_B^{PKE}$.

The key encapsulation mechanism, signature scheme and public key encryption scheme are conveniently packaged in the messaging application installed on each mobile phone 20 and 21. Accordingly, when a peer downloads the messaging application onto a mobile phone the peer is automatically provided with the same key encapsulation mechanism, signature scheme and public key encryption scheme as other peers.

The key exchange between Alice and Bob proceeds as follows. In Bob's step 1 shown in FIG. 3, Bob generates an ephemeral key pair ek$^{KEM}$ and dk$^{KEM}$ using the key generation function KeyGen. The key generation function, KeyGen (1$^\lambda$) takes a binary value of 2 bits length and generates the ephemeral key pair. The value 2 is commonly referred to as the security parameter. The ephemeral key ek$^{KEM}$ forms a public 'encryption' ephemeral key and the ephemeral key dk$^{KEM}$ forms a private 'decryption' ephemeral key.

In Bob's step 2, Bob uploads the public ephemeral key to the server 22. It is noted that the public ephemeral key is receiver-oblivious because no information about the identity of Alice was required to generate the public ephemeral key. The procedure assumes that Bob is registered with the server 22 as a user of the messaging application. The server 22 stores Bob's public ephemeral key in a suitable data store or database in association with Bob's identity so that anyone wishing to send Bob a message can identify Bob to the server 22 and recover Bob's public ephemeral key. Any of Bob's public keys may also be stored by the server 22, or they could equally be recoverable from a trusted third-party key server or service.

The procedure assumes that Alice is registered with the server 22 as a user of the messaging application. Any of Alice's public keys may be stored by the server 22, or they could equally be recoverable from a trusted third-party key server or service. In Alice's step 1, Alice identifies Bob and retrieves from the server the public ephemeral key that Bob previously uploaded to the server 22. Alice generates a random value m, not shown, and uses the random value m and Bob's public ephemeral key, ek$^{KEM}$, with the SABER key encapsulation function, KEM.Enc, to return a ciphertext, c, and a first parameter I. The first parameter I corresponds to the symmetric key in the SABER Key encapsulation function.

In Alice's step 2, Alice signs the ciphertext, c, using the Falcon signature scheme and her signing key, sk$_A$, to generate a signature, σ.

In Alice's step 3, Alice uses the SABER public key signature scheme to encrypt the signature, σ, using Bob's public key, ek$_B^{PKE}$. This process generates an encrypted signature, c$_σ$.

In Alice's step 4, Alice generates a common key, K, by hashing the first parameter I and the signature σ. In the embodiment, the SHA-3 hashing algorithm is used, but other hashing algorithms such as SHA-2 could be used.

Alice uploads the encrypted signature, c$_σ$, and the ciphertext, c, to the server 22.

In Bob's step 3, Bob retrieves the encrypted signature, c$_σ$, and the ciphertext, c, that Alice uploaded to the server 22. Bob uses the SABER decapsulation algorithm, KEM.Dec, Bob's secret ephemeral key, dk$^{KEM}$, and the public ephemeral key, ek$^{KEM}$, to retrieve the first parameter I.

In Bob's step 4, Bob uses the SABER public key decryption mechanism, PKE.Dec, to decrypt the encrypted signature, c$_σ$, and retrieve the signature σ.

In Bob's step 5, Bob verifies the signature, c$_σ$, by using the Falcon verify function and compares the cipher, c, received from Alice with the verified signature. To do this, Bob uses Alice's pubic verification key, vk$_A$. This step allows Bob to determine with a high degree of certainty whether Alice signed the cipher and whether or not he is communicating with Alice.

If the signature is verified, Bob forms a common key K by hashing the first parameter and the signature, σ. Bob uses the same hashing algorithm as Alice, in this case SHA-3. At this point Bob and Alice have derived the same common key K in a post-quantum-secure manner Subsequently, when Alice and Bob communicate with each other, they may use a key management protocol such as a post-quantum secure Double Ratchet. The Double Ratchet algorithm is not difficult to modify to be made post-quantum secure, as has been described in The Double Ratchet: Security Notions, Proofs, and Modularization for the Signal Protocol, by Joël Alwen, Sandro Coretti, and Yevgeniy Dodis published 21 Feb. 2020 on cryptology e-print archive. A post-quantum Double Ratchet variant is used in this example.

The above-described key-exchange process has several useful features. Firstly, the process is receiver-oblivious allowing for asynchronous communication between Alice and Bob. Bob's public ephemeral key, $ek^{KEM}$, does not require any information about Alice to generate. Accordingly, Bob can generate a public ephemeral key, upload it to the server 22 and go offline without worrying about who may try to contact him A second feature is that the key-exchange process allows an ephemeral key to be exchanged and a static common key to be generated for Alice and Bob. This replicates the behaviour of X3DH and allows this process to be a candidate to replace X3DH. A third feature of the process is that it is flexible regarding the key encapsulation mechanism, public key encryption scheme, signature scheme and hashing scheme used. Accordingly, when implementing the process, it is possible to choose a suitable algorithm for each of the mentioned functions. Whilst some preferred embodiments, use post-quantum schemes, the key exchange process in principle works with traditional (i.e. non-post-quantum-secure) key encapsulation schemes such as RSA, public key encryption schemes, such as El Gamal, and other signature schemes, such as RSA. In terms of post-quantum schemes, the key encapsulation mechanism, public key encryption scheme and signature scheme may be chosen from any of lattice-based, code-based, hash-based, braid-group, isogeny based and other types.

Figure 4:
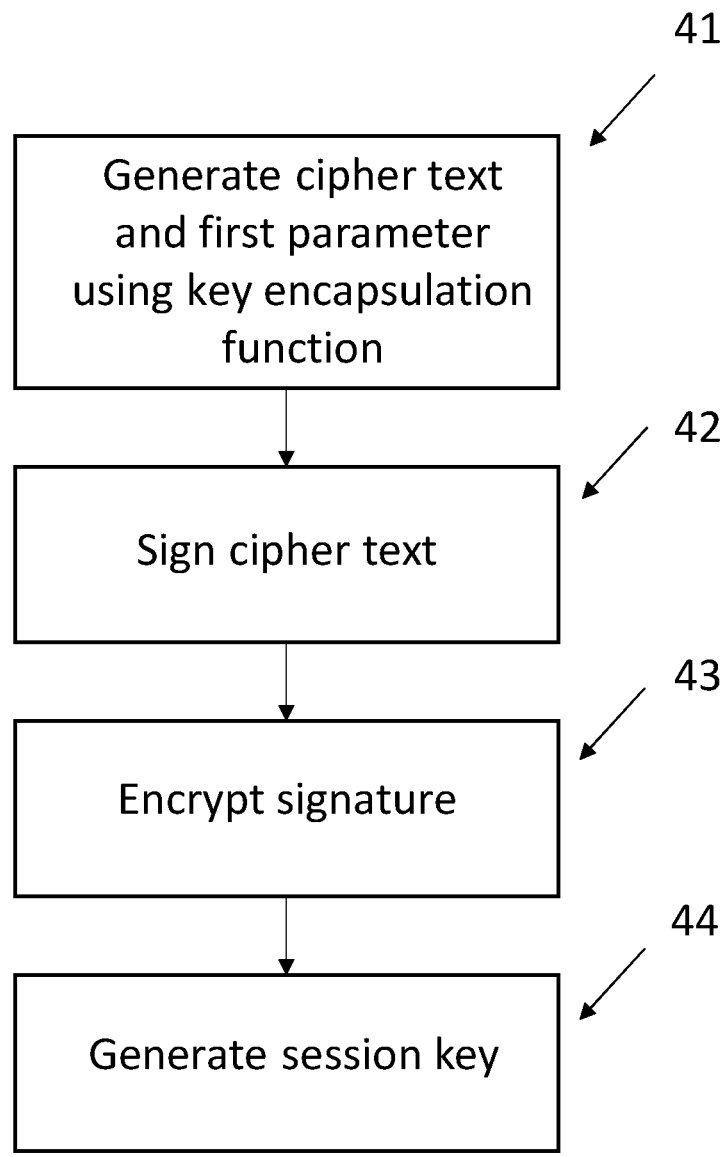
FIG. 4 is a flow chart that shows steps of a method performed by a first peer according to an example.

The steps described above and performed by Alice are illustrated in FIG. 4. Initially, Alice receives an ephemeral key from Bob. In step, S41, Alice uses the ephemeral key and a key encapsulation function of a key encapsulation mechanism to generate a ciphertext, c, and a first parameter, I. In step, S42, Alice signs the ciphertext using a signature scheme, c, to generate a signature, σ. In step, S43, Alice encrypts the signature, σ, using a public key encryption scheme to generate an encrypted signature, $c_σ$. In step, S44, Alice generates a common key, K, by hashing or otherwise combining the first parameter, I, and the signature, σ. Alice then uploads the encrypted signature, $c_σ$, and ciphertext, c, to a server for Bob to retrieve.

Figure 5:
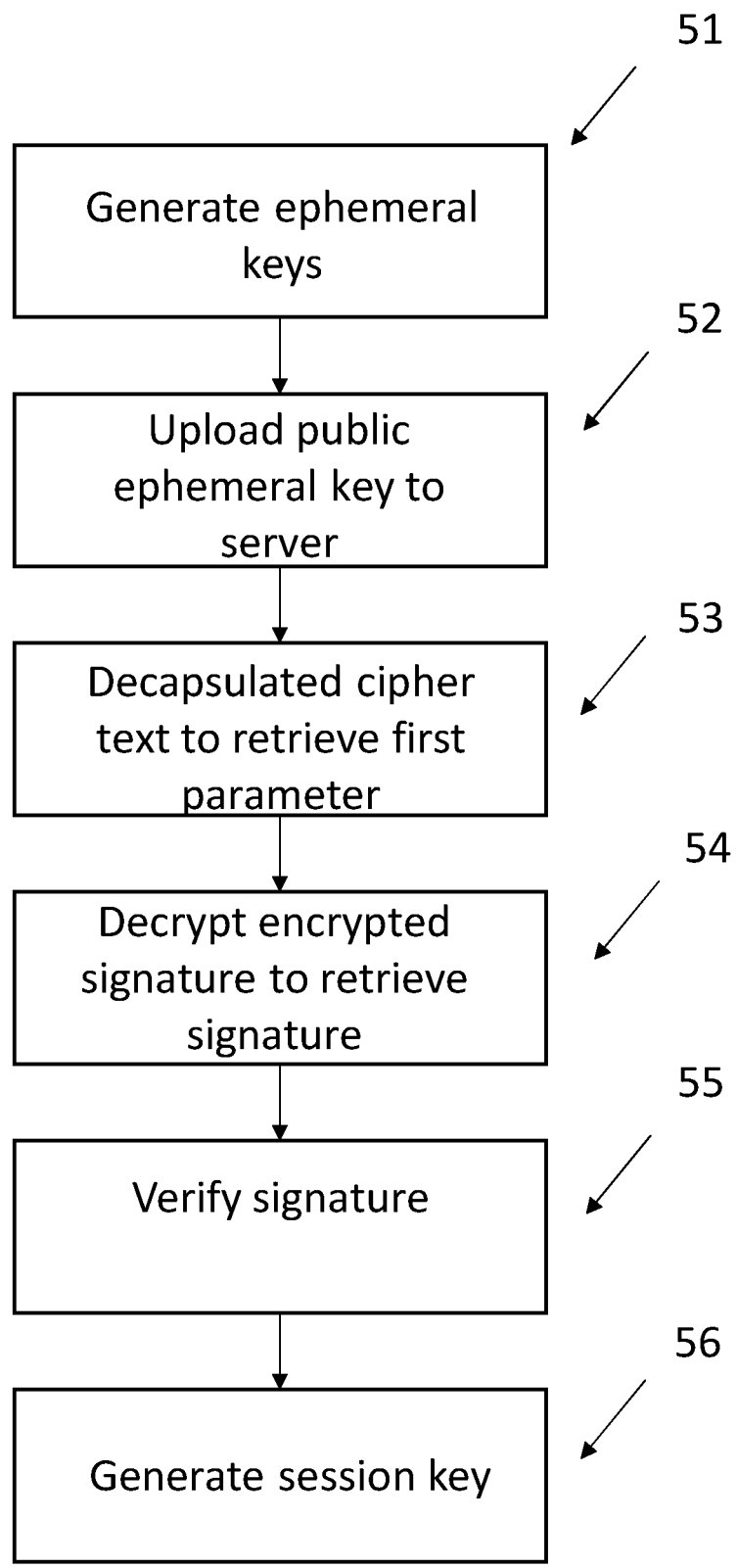
FIG. 5 is a flow chart that shows steps of a method performed by a second peer according to an example.

The steps performed by Bob are illustrated in FIG. 5. First, in step S51, Bob generates an ephemeral key pair using a key generation function of a key encapsulation mechanism. In step, S52, Bob uploads a public ephemeral key to the server 22. In step S53, possibly sometime later, Bob retrieves the ciphertext, c, and the encrypted signature, $c_σ$. Bob decapsulates the ciphertext, c, using a decapsulation function of a key encapsulation mechanism to retrieve the first parameter, I. In step S54, Bob uses a public key decryption function of a public key encryption scheme to decrypt the encrypted signature, $c_σ$, to retrieve the signature, σ. In step S55, Bob verifies Alice's signature using a verification function of a signature scheme and Alice's public verification key. If Alice's signature is verified, Bob generates a session key, K, from the first parameter and the signature by hashing or other combination method. At this stage, when Alice and Bob have completed the steps of FIGS. 4 and 5, Alice and Bob have derived the same session key.

The above embodiments are to be understood as illustrative examples of the invention. Further embodiments of the invention are envisaged. For example, although communication between mobile phones has been described above, the peers may be used in many different contexts, such as on laptop computers, tablet computers, workstations, communication devices, use in ASICs etc. The embodiment above describes the situation in which the peers are messaging applications. However, the peer may take many other forms including any other form of software with a communication function, such as video calling software, or software for secure transfer of data. The peers could also be implemented in hardware, such as in an integrated circuit The embodiment described above forms a common key using a hash of first parameter, I, and signature, σ. However, in order to prevent unknown key share attacks the session key could be generated as K=H(trans, I, σ), where trans is a transcript of the communication between the two peers, Alice and Bob. The transcript is the communication between the users ($ek^{KEM}$, c, $c_σ$) along with the public keys of the users ($vk_A$, $vk_B$, $ek_B^{PKE}$, $ek_A^{PKE}$).

A further consideration is how to migrate from pre-quantum to post-quantum messaging. As noted in the example, Alice and Bob need to use the same key encapsulation mechanism, signature scheme, and public key encryption scheme. If the key encapsulation mechanism, signature scheme, and public key encryption scheme are to change to become post-quantum, it may be necessary for all the peers who wish to communicate to transition at the same time. In practice, this may be difficult because an updated messaging application will need to be installed on each mobile phone or other device. Accordingly, a problem may arise that some users have upgraded their application and other users have not upgraded their application. A solution to this problem is for the messaging application to support two or more combinations of the key encapsulation mechanism, the signature scheme, and the public key encryption mechanism. In this case, Bob may generate an ephemeral key pair using the key generation function from each of the two or more combinations along with an identifier that indicates which combination is being used.

Figure 6:
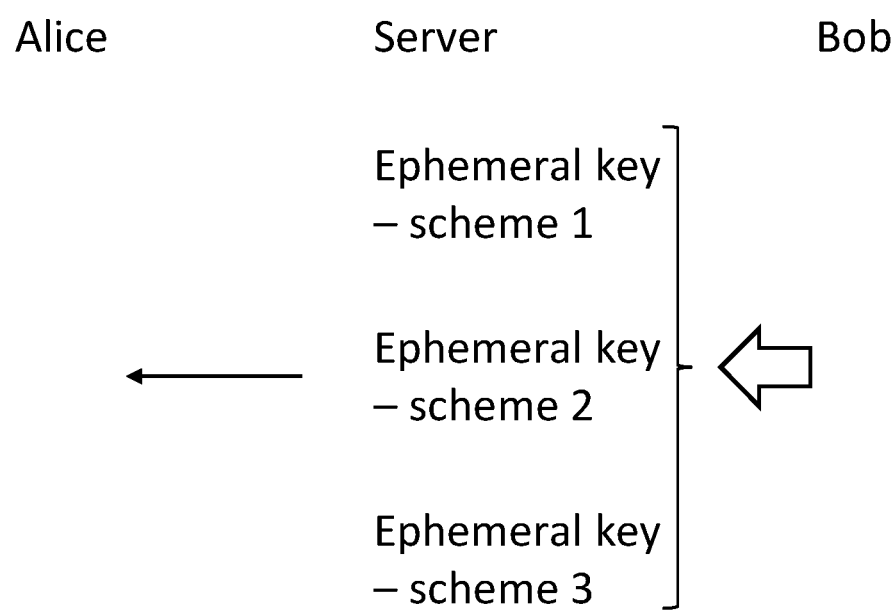
FIG. 6 is a message flow diagram that shows ephemeral key exchange in a further embodiment.

FIG. 6 illustrates the use of multiple combinations of key encapsulation mechanism, the signature scheme, and the public key encryption mechanism. In this case, the Bob supports three different combinations of key encapsulation mechanism, the signature scheme, and the public key encryption scheme. Bob generates an ephemeral key using the key generation function of each combination and uploads it to the server along with an identifier that identifies the combination. Possibly some time later, Alice wants to communicate with Bob and retrieves an ephemeral key from the server. At this time, Alice can choose between the three ephemeral keys that Bob has uploaded depending upon the combinations that she supports. Preferably, she will pick the ephemeral key for the most secure combination that Alice supports. When Alice returns information, such as key exchange parameters, to Bob, she will also include an identifier that identifies the combination that she is using. In this way, Bob can identify which ephemeral key Alice has used and which combination Alice is using. Bob can use the identified combination of key encapsulation mechanism, signature scheme, the public key encryption scheme along with the received key exchange parameters to derive a common key with Alice. Accordingly, it is possible for peers to support multiple key exchange processes and to transition between different combinations of key encapsulation mechanism, the signature scheme, and the public key encryption scheme without all peers needing to update at the same time. In particular, it is possible to transition from pre-quantum to post-quantum key exchange processes.

Further Embodiment

Figure 7:
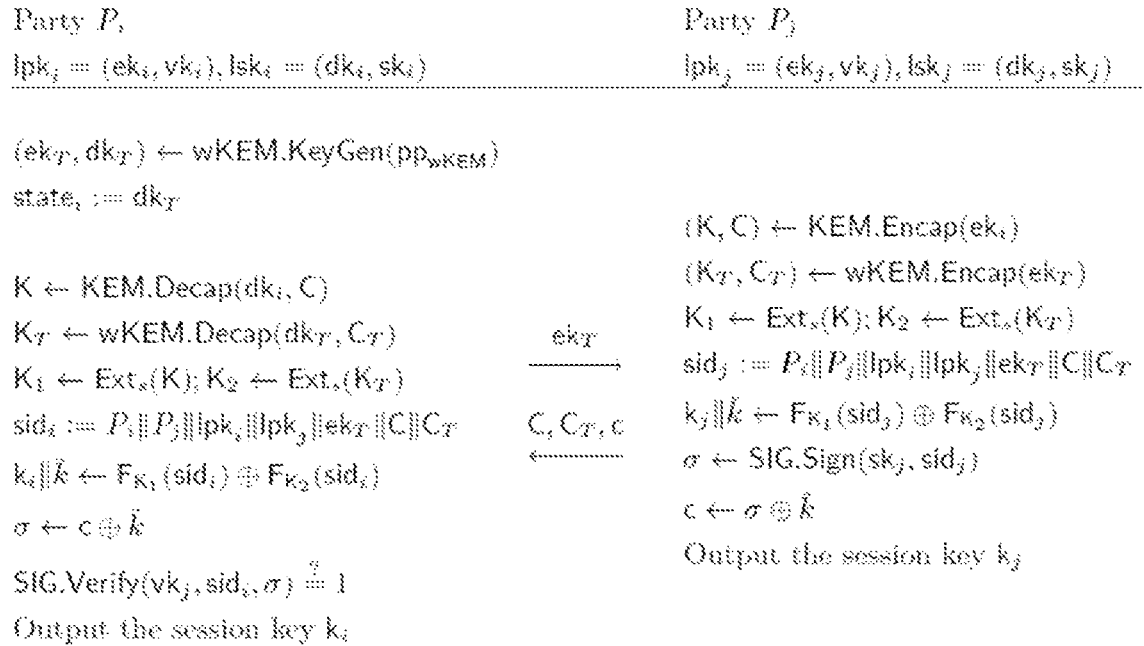
FIG. 7 is a message flow diagram that shows a key exchange process according to a further example.

FIG. 7 shows a further method for generating a session key. This embodiment involves communication between Party i ($P_i$), and party j ($P_j$). Party i has a static public key pair $lpk_i$ and a static private key pair $lpsk_i$. Party j has a static public key pair $lpk_j$ and a static private key pair $lsk_j$. Each key pair includes a key relating to encryption and a key relating to a signature scheme. Accordingly, keys ek and dk for parties i and j relate to encryption and decryption whereas keys vk and sk for Parties i and j relate to signature and verification. Both parties, i and j, have access to common parameters including a randomly chosen seed, s, and common parameters for setting up two key encapsulation mechanisms. These may be shared via a server or some other mechanism.

The parties may use some or all parts of a first key encapsulation mechanism (KEM) which is IND-CCA secure (INDistinguishability under adaptive Chosen Ciphertext Attack). The first key encapsulation mechanism includes a key generator, KEM.KeyGen, an encapsulation function KEM.Enc, and a decapsulation function, KEM.Dec.

The parties may also make use of some or all parts of a second key encapsulation mechanism (wKEM) is a KEM which is IND-CPA secure (INDistinguishability under Chosen Plaintext Attack). The second key encapsulation mechanism includes a key generator, wKEM.KeyGen, an encapsulation function wKEM.Enc, and a decapsulation function, wKEM.Dec.

The parties may also make use of some or all parts of a signature scheme that includes a key generator, SIG.KeyGen, a signature function, SIG.Sign and a verification function, SIG.Verify.

The method for generating a session key begins with Party i generating ephemeral keys $ek_T$ and $dK_T$ using wKEM.KeyGen. Party i sends one of the ephemeral keys, $ek_T$ to Party j. As with the earlier embodiments, this ephemeral key is receiver oblivious.

Party j receives the ephemeral key, $ek_T$. Party j generates a cypher text $C_T$ that encapsulates a value $K_T$ using the received ephemeral key, $ek_T$, and key encapsulation function wKEM.Encap($ek_T$).

Party j further generates a second cypher text C that encapsulates a value K using Party is public encryption key and key encapsulation function KEM.Encap($ek_i$).

Party j uses an Extractor function (a strong randomness extractor such as HMAC-SHA256) $Ext_s$ to generate two intermediate keys in the form of pseudo-random function (PRF) keys, $K_1$ and $K_2$.

Party j is then is a position to generate a session identifier, $sid_j$, formed from a concatenation of an identifier of Party i ($P_i$), an identifier of Party j ($P_j$), the public keys (encryption and signature) of Party i, the public keys (encryption and signature) of Party j, the exchanged ephemeral key ($ek_T$), the cipher text $C_T$ and the second ciphertext C.

Party j computes a pair of keys $k_j$ and $\tilde{k}$ using a pseudo-random function, F. An example of the pseudo-random function is HMAC-SHA256, but other functions may be used. These keys are generated using an exclusive or of the output of the pseudo-random function operating on PRF key $K_1$ and the session ID, $sid_j$, and the pseudo-random function operating on PRF key $K_2$ and the session ID, $sid_j$. A first of those keys, kj, is the session key, which is the output of the key generation method, and the second of the keys, $\tilde{k}$, will be referred to as the signature key. While an exclusive or is used to generate the pair of keys in the example above, a sum or modulo of the pseudo-random functions may be used in alternative implementations.

Party j signs the session ID, $sid_j$, using its secret key $sk_j$ to generate a signature σ.

The signature is encrypted using the signature key, $\tilde{k}$ to generate a cipher text, c.

The cypher texts, C, $C_T$ and c are sent from Party j to Party i. As described in earlier embodiments this transfer may be direct or indirect, such as via a server.

Party i then performs the following steps to generate the session key, $k_i$, and verify the identity of Party j. Party i uses the decapsulation function, its private key, $dk_i$, and received second ciphertext, C, to generate value K. In other words, Party i calculates KEM.Decap($dk_i$, C).

Party i also uses the decapsulation function and the ephemeral key, $dk_T$, that was previously generated but not exchanged with Party j to generate value $K_T$.

Similar to the operation performed by Party j, Party i uses the Extractor function $Ext_s$ to generate two pseudo-random function (PRF) keys, $K_1$ and $K_2$.

At this point Party i can generate a session ID, $sid_j$ which should be the same as session ID, $sid_j$, generated by Party j if the parties are behaving honestly. The session identifier, $sid_j$, is formed from a concatenation of an identifier of Party i ($P_i$), an identifier of Party j ($P_j$), the public keys (encryption and signature) of Party i, the public keys (encryption and signature) of Party j, the exchanged ephemeral key ($ek_T$), the cipher text $C_T$ and the second cipher text C.

Party i then computes the pair of keys $k_j$ and $\tilde{k}$ using the pseudo-random function, F. The keys are generated using an exclusive or of the output of the pseudo-random function operating on PRF key $K_1$ and the session ID, $sid_j$, and the pseudo-random function operating on PRF key $K_2$ and the session ID, $sid_j$. A first of those keys, $k_i$, should be the same session key as generated by Party j, if the Parties are acting honestly. As above, the second of the keys, $\tilde{k}$, is referred to as the signature key.

Party i can verify the identity of Party j as follows. The cipher text c is decrypted using signature key, $\tilde{k}$. The signature can be verified by using a signature verification function that takes the public key of Party j, $vk_j$, the calculated session ID, $sid_i$, and compares it with the decrypted signature σ.

If both parties have behaved honestly, the method ends with Party i having verified the identity of Party j and with both parties having the same session key, $k_i/k_j$. Party i may delete the ephemeral key, $dk_T$, once the session key, $k_i$, is generated.

Figure 8:
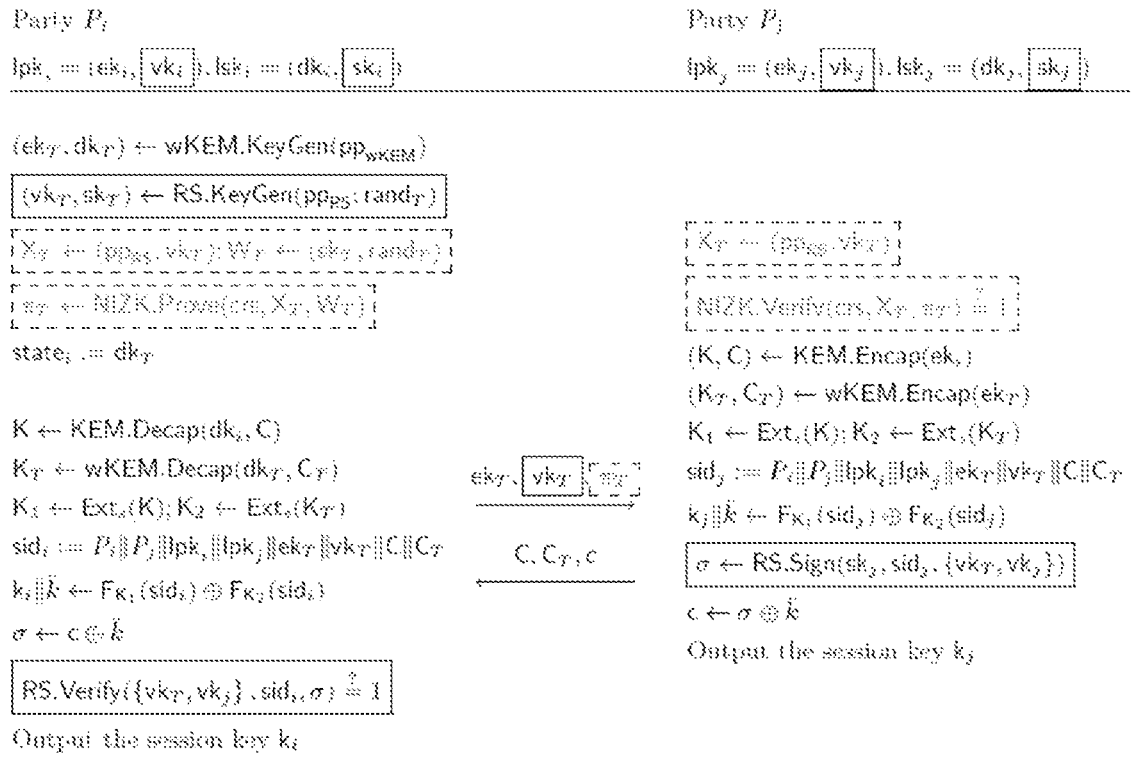
FIG. 8 is modification of the message flow diagram shown in FIG. 7 that shows a key exchange process according to yet further examples.

FIG. 8 shows two modifications to the method described in connection with FIG. 7. The features shown in boxes in FIG. 8 differ from those steps previously described in connection with FIG. 7. Accordingly, the description of steps from FIG. 7 will not be repeated but a first modification relating to the steps in solid boxes will first be described and then a second modification relating to the steps in dashed boxes in FIG. 8 will be described.

The first modification, represented by the steps in solid boxes in FIG. 8, is the introduction of a ring signature scheme to the method of FIG. 7. The ring signature scheme includes a key generator, RS.KeyGen, a signature function, RS.Sign, and a verification function, RS.Verify. The key signature scheme is commonly configured between Party i and Party j by public configuration parameter $PP_{RS}$. Examples of possible ring signature schemes are described in Table 1 of "Calamari and Falafl: Logarithmic (Linkable) Ring Signatures from Isogenies and Lattices" by Ward Beullens, Shuichi Katsumata, and Federico Pintore, 2020—eprint.iacr.org.

The ring signature scheme is a scheme that allows any member of a group to sign on behalf of the group. Possession of a ring signature allows determination that the signature was made by a member of the group, but not determination of which member of the group made the signature. According to the modification which will now be described, Party $P_i$ and Party $P_j$ sign using the ring signature scheme. If the signature is compromised at some point later, a third party can tell that the signature was generated by either Party $P_i$ or Party $P_j$, but cannot determine which party signed the message.

The static keys of Party $P_i$ and Party $P_j$ are modified so that each Party has a public and private key according to the ring signature scheme. Party $P_i$, has public key, $vk_i$, and private key, $sk_i$. Party $P_j$ has public key, $vk_j$, and private key, $sk_j$.

An additional step performed by Party i is generation of an ephemeral ring signature scheme key pair using the function RS.KeyGen($PP_{RS}$, $rand_T$), where $rand_T$ is a random number generated at Party i. The ephemeral key pair includes an ephemeral signature key, $sk_T$, and an exchange key in the form of an ephemeral verification key, $vk_T$.

The parameters exchanged from Party i to Party j are supplemented with the ephemeral verification key $vk_T$, which may be sent with or separately from the ephemeral key $ek_T$ previously described.

When Party j comes to create a signature $\sigma$, Party j uses the ring signature scheme which takes the values of: the static signature key, $sk_j$, the session ID, $sid_j$, the received verification key, $vk_T$, and Party j's public signature verification key $vk_j$.

When Party i comes to verify the signature, $\sigma$, Party i uses the ring scheme verification function which takes the exchanged verification key, $vk_T$, Party j's public verification key, $vk_j$, the session ID, $sid_i$, and the decrypted signature $\sigma$. In this way, Party i can confirm that Party j created the signature because he knows that he did not produce the signature himself and the verification function has checked that the signature belongs to the ring. However, a third party that obtains the signature cannot determine which of Party i or Party j created the signature by virtue of use of the ring signature scheme.

A second modification of the method builds upon the first modification. That is to say that the previously described steps of the method of FIG. 7 and first modification are also present in the second modification and the description of those steps will not be repeated. The additional steps of the second modification are shown in the dashed boxes in FIG. 8.

The second modification introduces an NIZK (Non-Interactive Zero Knowledge) argument system. The NIZK system includes a proof generation function, NIZK.Prove, and a verification function, NIZK.Verify. The NIZK system is configured with a common reference string, crs that is available to both parties. The NIZK proof is introduced in the second modification to cause Party i to prove to Party j that it knows the ring signing key associated with the exchanged ring verification key, $vk_T$. An example of a NIZK is described in "Noninteractive Zero Knowledge for NP from (Plain) Learning With Errors" by Chris Peikert and Sina Shiehian, originally published in IACR-CRYPTO-2019.

Party i generates a pair of parameters $X_T$ and $W_T$. $X_T$ is generated from the public parameter of the ring scheme, $PP_{RS}$, and WT is generated from the ephemeral private ring signature key, $sk_T$, generated by Party $P_i$ and the random number, $rand_T$.

Party i calculates a proof $\pi_T$ based on parameters $X_T$ and $W_T$. That is, Party i calculates NIZK.Prove (crs, $X_T$, $W_T$), where crs is the common reference string.

The proof, $\pi_T$, is sent (directly or indirectly) by Party i to Party j with or separately from the ephemeral key, $ek_T$, and the ephemeral ring verification key, $vk_T$.

Party j, after receipt of the proof $\pi_T$, generates the parameter $X_T$ from $PP_R$s and the received ring verification key, $vk_T$. Party j then uses the NIZK verification function to check the proof and confirm that Party i is in possession of the ephemeral ring signature key, $sk_T$. The verification is calculated as NIZK.Verify (crs, $X_T$, $\pi_T$), where crs is the common reference string.

The first modification described above provides deniability that is suitable for use under the assumption that the parties Party i and Party j are semi-honest, which is to say that they will follow the prescribed protocol. As explained above, this deniability means that a third party cannot tell which party signed the message by virtue of use of the ring encryption scheme. The second modification is slower but allows for the assumption of a malicious adversary, who might deviate from the prescribed protocol. More particularly, the NIZK proof allows Party j to confirm that the ring signature $vk_T$ was generated honestly.

As with earlier embodiments, the further embodiments described above have the features that the ephemeral key, $ek_T$, is receiver-oblivious and that the method is flexible for use with different encryption and signature schemes. As described previously, the embodiments may be combined with a key management protocol such as a post-quantum secure Double Ratchet during communication between the parties $P_i$ and $P_j$.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of generating a session key for exchange of data between a first peer and a second peer, the method comprising the second peer:
    obtaining an ephemeral key from the first peer;
    using the ephemeral key to compute a ciphertext, such that the ciphertext encrypts a first parameter;
    computing a second ciphertext, such that the second ciphertext encrypts a second parameter;
    generating a pair of intermediate keys from the first parameter and the second parameter;
    encrypting a session identifier using two intermediate keys to generate the session key, wherein the two intermediate keys are the pair of intermediate keys; and
    sending the ciphertext and second ciphertext to allow the first peer to generate the session key based on the ciphertext and second ciphertext,
    wherein the session identifier is generated based on one or more of: an identifier of the first peer, an identifier of the second peer, a public key of the first peer, a public key of the second peer, the ephemeral key received from the first peer, the cipher text computed from the received ephemeral key, and the second ciphertext.

2. A method according to claim 1, further comprising signing the session identifier using a signing function of a signature scheme to generate a signature.

3. A method according to claim 2, further comprising encrypting the signature with a key generated by encrypting the session identifier using the two intermediate keys.

4. A method according to claim 2, wherein the signature scheme is a ring signature scheme and the method comprises receiving an exchange key for the ring signature scheme.

5. A method according to claim 4, further comprising:
receiving a proof from the first peer that the first peer is in possession of a private signature key corresponding to the received exchange key; and
verifying the received proof using the exchange key.

6. A method according to claim 1, wherein in the method is for generating a session key for communication between a first peer and a second peer and the ephemeral key is a receiver-oblivious ephemeral key.

7. A method of generating a session key for exchange of data between a first peer and a second peer, the method comprising the first peer:
obtaining a ciphertext that encrypts a first parameter;
receiving a second ciphertext that encrypts a second parameter from the second peer;
decrypting the ciphertext to obtain the first parameter;
decrypting the second ciphertext to generate a second parameter;
generating a pair of intermediate keys from the first parameter and the second parameter; and
encrypting a session identifier using two intermediate keys to generate the session key, wherein the two intermediate keys are the pair of intermediate keys,
wherein the session identifier is generated based on one or more of: an identifier of the first peer, an identifier of the second peer, a public key of the first peer, a public key of the second peer, an ephemeral key, the cipher text, and the second ciphertext.

8. A non-transitory computer-readable storage medium storing a program that, when executed on an information processing apparatus, causes the information processing apparatus to perform a method of generating a session key for exchange of data between a first peer and a second peer, the method comprising the second peer:
obtaining an ephemeral key from the first peer;
using the ephemeral key to compute a ciphertext, such that the ciphertext encrypts a first parameter;
computing a second ciphertext, such that the second ciphertext encrypts a second parameter;
generating a pair of intermediate keys from the first parameter and the second parameter;
encrypting a session identifier using two intermediate keys to generate the session key, wherein the two intermediate keys are the pair of intermediate keys; and
sending the ciphertext and second ciphertext to allow the first peer to generate the session key based on the ciphertext and second ciphertext,
wherein the session identifier is generated based on one or more of: an identifier of the first peer, an identifier of the second peer, a public key of the first peer, a public key of the second peer, the ephemeral key received from the first peer, the cipher text computed from the received ephemeral key, and the second ciphertext.

* * * * *